United States Patent [19]

Reber

[11] 3,708,966
[45] Jan. 9, 1973

[54] AGRICULTURAL MACHINE ROTOR-TYPE CUTTING MECHANISM

[75] Inventor: Walter Reber, Saverne, France

[73] Assignee: Societe Kuhn Freres & Cie, Societe En Commandite Simple, Saverne, Bas-Rhin, France

[22] Filed: Feb. 10, 1970

[21] Appl. No.: 10,140

[30] Foreign Application Priority Data

Feb. 25, 1969 France...............................6905002

[52] U.S. Cl. ......................56/6, 56/17.4, 56/192, 56/503
[51] Int. Cl. ...........................................A01d 75/30
[58] Field of Search..........56/6, 17.4, 503, 192, 255, 56/295

[56] References Cited

UNITED STATES PATENTS

| | | | |
|---|---|---|---|
| 3,105,341 | 10/1963 | Crump | 56/503 X |
| 3,469,378 | 9/1969 | Heesters et al. | 56/6 X |
| 3,524,306 | 8/1970 | Reber | 56/192 X |

Primary Examiner—Louis G. Mancene
Assistant Examiner—J. A. Oliff
Attorney—Ernest G. Montague

[57] ABSTRACT

A rotary-scythe mower or other agricultural machine rotor-type cutting mechanism having a drive below the rotors, including one or more non-rotating spindles at least substantially concentric with one or more of the rotors.

13 Claims, 8 Drawing Figures

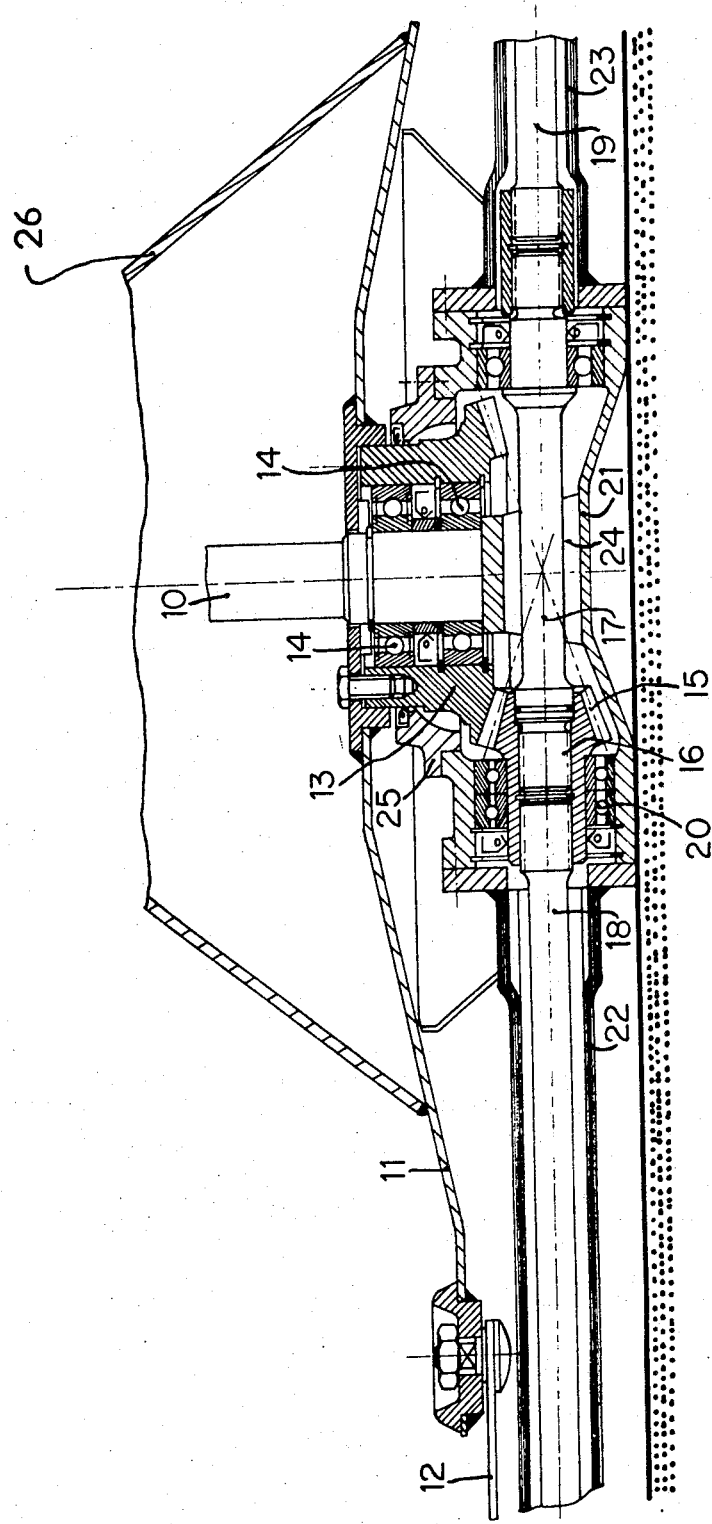

AGRICULTURAL MACHINE ROTOR-TYPE CUTTING MECHANISM

INTRODUCTION AND BACKGROUND OF THE INVENTION

This invention relates to an improvement in rotor-type cutting mechanisms used on agricultural machines.

The present invention has for object an improvement in rotor-type cutting mechanisms used especially in rotary mowers, which is noteworthy in that it consists in providing, concentrically or non-concentrically with the rotors, one or more static solid or hollow spindles, these spindles permitting the simple and rapid fixing of protection devices, supplementary elements for the raising of the cutting mechanism, deflectors or apparatus for the treatment or displacement of the cut crop.

On known rotary mowers having a drive placed beneath the cutting-element-carrier rotors, when the cutting mechanism is in the working position, the protection of the driver of the tractor vehicle against the throwing up of earth or even pebbles which can be caused by the rapid rotation of the cutting-element-carrier rotors is effected by a protection device fixed either in overhung manner on the chassis of the mower, as represented by way of example in FIG. 1 of the accompanying drawings, or on two or more supports situated generally on either side of the cutting mechanism outside the cutting zone, that is quite distant from one another, as shown in FIG. 2 of the accompanying drawings. These two known arrangements necessitate protection devices which — in order to be effective without excessive flexing or even breaking during mowing on broken ground where the mower is subjected to numerous shocks — must be made of appropriately dimensioned materials and therefore become heavy, burdensome and difficult to handle (placing of the cutting mechanism in the transport position), especially in the case of a mower having a large working width. Furthermore in the case of the second arrangement mentioned above, the fixing of the protection device outside the cutting zone (as indicated at 1 in FIG. 2 of the accompanying drawings) opposes the normal flow of the crop and can cause entanglement and blockage harmful to the good progress of the work.

BRIEF SUMMARY OF THE INVENTION

The present invention consists of a drive system for the cutting-element-carrier rotors made in such a way as to have one or more non-rotating, solid or hollow spindles, which are partially or wholly substantially concentric with the axis or axes of rotation of one or more cutting-element-carrier rotors, the non-rotating spindle or spindles to allow the easy mounting and removal of various devices and accessories.

FURTHER DESCRIPTION AND ADVANTAGES OF THE INVENTION

The invention provides additional spindles for permitting:

The rapid fixing of a protection device which, as it can be supported at adjacent points, even on mowers having a large working width, can be much lighter, more manuverable and less burdensome for the same efficiency as the hitherto known devices. Moreover this manner of fixing will not harm the quality of the work. In fact during mowing, caps fast with the cutting-element-carrier rotors and surrounding the said non-rotating spindles according to the invention contribute to causing the flow of the crop to the rear;

The fixing of elements assisting in raising the cutting mechanism from its working position. This new possibility permits while retaining the numerous advantages of rotary mowers having a drive placed beneath the cutting-element-carrier rotors, of having working widths greater than those known hitherto on these mowers. In fact it is known that the cutting mechanisms of rotary mowers having a drive beneath the cutting-element-carrier rotors are generally heavy. It is also known that the height of the casing supporting the rotors and the drive elements must be as slight as possible in order that cutting may be effected close to the ground. Now these cutting mechanisms, when they are fixed in overhang manner on a chassis carried or drawn by a tractor vehicle, must not exceed a certain weight and thus a certain length (working front), otherwise there is excessive flexing of the casing supporting the rotors and the drive elements and consequently damage or deterioration of these latter during the lifting of the cutting mechanism from its working position. This risk is increased when the cutting mechanism and the device for the protection of the driver are covered with a thick layer of wet earth and crop, which occurs quite frequently in practice. Thus for example it is possible to make use of one or more non-rotating spindles according to the invention to fix a cross-piece, possibly connecting them, which can serve at the same time as support for elements assisting in lifting the cutting mechanism from its working position (rigid or elastic tie-rod, spring, rod, chain, hydraulic or mechanical jack), or lighten the ground weight of the latter and of the framework of the driver-protection device. The non-rotating spindles according to the invention have as stated above the advantage of not impairing the flow of the crop;

The casing supporting the rotors and the drive elements, thus stiffened and capable of being raised under optimum conditions, can thus be longer and thus the working width of the mower can be grater and consequently the output in mowing can be improved in a significant manner;

The fixing of one or more windrowing deflectors. This problem had hitherto frequently been difficult to solve on bottom-driven rotary mowers and sometimes necessitated quite irksome solutions by reason of the risks of winding of the crop around this fixing.

The fixing of a mechanism or machine permitting the treatment or displacement of the cut crop (conditioner, spreader, windrower), the assembly being drawn by a tractor vehicle; and Of fixing the cutting mechanism on the frame of a self-propelled machine which can be a simple mower or a mower combined with a machine for the treatment or displacement of the crop (conditioner, spreader, windrower, loader), any devices (parallelograms, slides, jacks, springs, etc.) being capable of being interposed between the said spindle or spindles and the said frame for the purpose of permitting for example:

Of raising the cutting mechanism from its working position and lowering it;

of diminishing the ground weight of the cutting mechanism;

of inclining the cutting mechanism in relation to the ground;

of causing the cutting mechanism to follow the variations of level of the ground; and of causing the cutting mechanism to retract into a desired position in the case where it encounters an obstacle.

BRIEF DESCRIPTION OF THE VIEWS IN THE DRAWINGS

The invention will be further explained hereinafter with reference to the accompanying drawings, wherein:

FIG. 3 shows a partial longitudinal section of a form of embodiment according to the invention of a cutting mechanism comprising a fixed spindle;

DETAILED DESCRIPTION OF THE PREFERRED EMBODIMENTS

Figure 1:
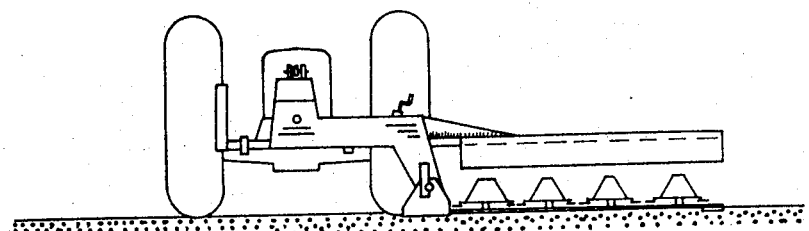
FIGS. 1 and 2 show two views showing the present-day fixing of the protection device above the rotors.
Figure 2:
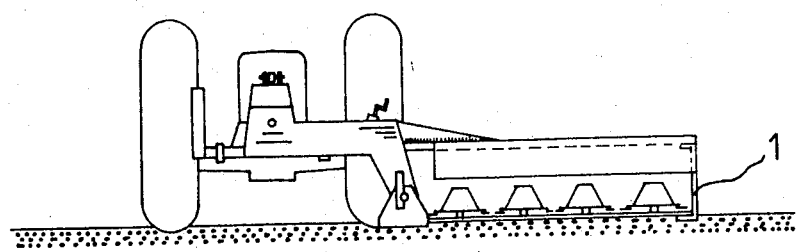

As represented by way of example in FIG. 3 of the accompanying drawings, the improvement according to the invention consists in the provision of a solid or hollow fixed spindle 10, substantially concentric with the center of rotation of the rotor 11 carrying the cutting elements 12.

For this purpose the rotor 11 is operatively rigidly connected to a toothed ring 13 guided in rotation by bearings 14 housed on the fixed spindle 10. This toothed ring 13 is rotatably driven by a bevel pinion 15 fast by means of splines 16 with a drive shaft 17 which in the example represented for the purpose of simplifying its manufacture, treatment and fitting is made in several parts 17, 18, 19 and guided in rotation by bearings 20 housed in a casing 21 operatively rigidly connected with the fixed spindle 10. This casing 21, comprising a lid 25 in order to ensure a seal from the exterior, is rigid with a casing of several parts 22, 23 surrounding the drive shaft 17.

A space 24 is provided in the casing 21 beneath the fixed spindle 10, for the purpose of permitting the drive of an adjacent rotor.

A cap 26 rigidly connected to the rotor 11 avoids winding of the crop, during mowing, around the fixed spindle 10, the upper end of which can be made in such a manner as to possess an external or internal threading, a centring with shoulder, a hole for the insertion of a pin, or any other device permitting easy fixing or hooking of accessories of all kinds.

In operation, the drive shaft 17 is rotated, causing, via the splines 16, the bevel pinion 15 to mesh rotatably with the gear teeth of the toothed ring 13. This causes the latter to rotate about spindle 10 on the bearings 14, as well as the rotor 11 with cutting elements 12 secured therewith.

Figure 4A:
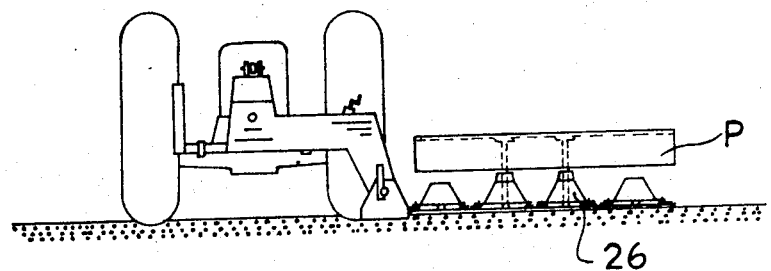
FIGS. 4a and 4b show two variants of the securing of the protection device in accordance with the invention.

The provision of these non-rotating spindles on the rotors at more or less great spacing permits easy fixing and reliable maintaining, even on mowers with large working width, of a protection device P which is effective, light, very manuverable and not burdensome, the flow of crop towards the rear being moreover favored by the fixing of the caps 26 about these non-rotating spindles (FIG. 4a).

Figure 4B:
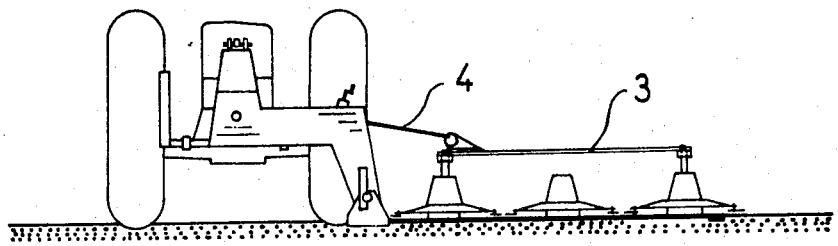

As shown in FIG. 4b, the non-rotating spindles can be united by a cross-piece 3 serving on the one hand as support for elements such as a tie-rod 4, for the raising of the cutting mechanism, and on the other hand as framework for the device for protection of the driver.

Figures 5, 6:
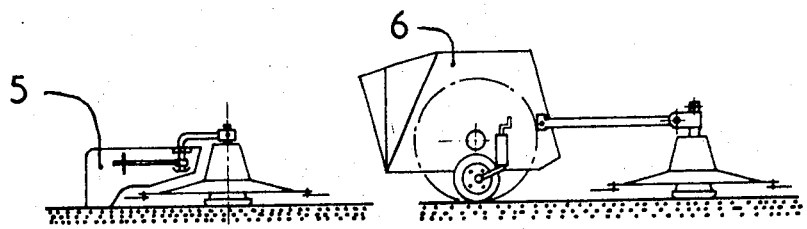
FIG. 5 shows a view showing the fixing of a deflector.
FIG. 6 shows a lateral elevation showing the attachment to a fixed spindle of a machine for the treatment or displacement of the cut crop.

According to a variant, these fixed spindles can also be used for the fixing of a windrowing deflector 5 (FIG. 5), or of a machine or mechanism 6 for the treatment or displacement of the cut crop, such as a conditioner, spreader, windrower or the like (FIG. 6).

Figure 7:
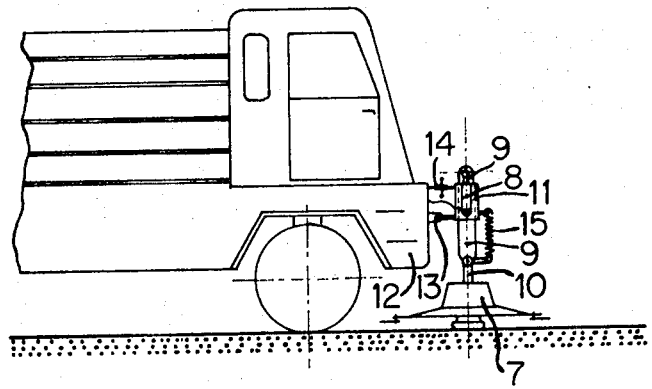
FIG. 7 shows a lateral elevation showing the fixing by one or more fixed spindles in accordance with the invention of the cutting mechanism to the frame of a self-propelled machine.

As represented in FIG. 7, the cutting mechanism can be fixed by means of its static spindle or spindles on the chassis of a self-propelled machine.

In this example of securing, the cutting mechanism 7 can be raised by means of two hydraulic jacks 8 each fixed on the one hand (piston side) on a slide block 9 fast with the spindle 10 according to the invention and on the other hand on a slideway 11 connected to the chassis 12 by means of an articulation 13 and of a double-acting jack 14 permitting of adjusting the inclination of the cutting mechanism in relation to the ground. Two tension springs 15 fixed on the one hand on the slideway 11 and on the other on the slide block 9 have the function of diminishing the ground weight of the cutting mechanism.

What is claimed is:

1. An improvement in the cutting mechanisms of agricultural machines including a mower, the latter comprising
    fast-rotating rotors,
    cutting elements carried by said rotors,
    a drive means disposed beneath said rotors,
    at least one non-rotatable fixed spindle crossing said rotors and extending in an upward substantially vertical direction, and
    the longitudinal axis of said spindle and the axis of rotating of said rotors being at least partially concentric for permitting said rotors to be driven about the longitudinal axis of said spindle by said drive means, said non-rotatable fixed spindle being surrounded laterally by a cap operatively connected with said rotor.

2. An improvement in the cutting mechanisms of agricultural machines according to claim 1, characterized in that the rotors are fast with a toothed ring guided in rotation by bearings housed on the fixed spindle and driven by a bevel pinion fast with a drive shaft guided in rotation by bearings housed in a casing fast with the said fixed spindle and assembled with a multipart casing surrounding the drive shaft, a space being provided in the casing beneath the fixed spindle for the purpose of permitting the drive of an adjacent rotor.

3. An improvement according to claim 1, characterized in that a cap fast with the rotor carrying the cutting elements surrounds the fixed spindle.

4. The improvement as set forth in claim 1, further wherein
    the upper end of said fixed spindle includes means for attaching thereto accessories.

5. The improvement as set forth in claim 1, further wherein
at least one of said fixed spindles contributes to the supporting of a device for the protection of a driver.

6. The improvement as set forth in claim 1, further comprising
means for the lifting of the said cutting mechanism operatively connected to at least one of said fixed spindles.

7. The improvement as set forth in claim 1, further wherein
at least one of said fixed spindles can at least partly support at least one windrowing deflector.

8. The improvement as set forth in claim 1, further wherein
at least one of said fixed spindles can at least partly connect means for the treatment of the crop to said cutting mechanism, and
said cutting mechanism being operatively drawn by a tractor vehicle.

9. The improvement as set forth in claim 1, further wherein
at least one of said fixed spindles can at least partly connect said mechanism to a frame of a machine which can constitute a self-propelled mower, and
accessory means interposed between at least one of said spindles and said frame.

10. The improvement, as set forth in claim 9, wherein
said accessory means cause the cutting mechanism to follow variations of level of the ground.

11. The improvement, as set forth in claim 9, wherein
said accessory means raise the cutting mechanism from its working position and lower it.

12. The improvement, as set forth in claim 9, wherein
said accessory means reduce the ground weight of the cutting mechanism.

13. The improvement, as set forth in claim 9, wherein
said accessory means incline the cutting mechanism in relation to the ground.

* * * * *